(12) United States Patent
Zhao

(10) Patent No.: US 12,090,899 B2
(45) Date of Patent: Sep. 17, 2024

(54) SAFETY BELT FASTENING DEVICE AND CHILD SAFETY SEAT THEREWITH

(71) Applicant: China Wonderland Nurserygoods Co., Ltd., Guangdong (CN)

(72) Inventor: Guanghui Zhao, Guangdong (CN)

(73) Assignee: China Wonderland Nurserygoods Co., Ltd., Dongguan (CN)

( * ) Notice: Subject to any disclaimer, the term of this patent is extended or adjusted under 35 U.S.C. 154(b) by 535 days.

(21) Appl. No.: 17/327,748

(22) Filed: May 23, 2021

(65) Prior Publication Data

US 2021/0370807 A1 Dec. 2, 2021

(30) Foreign Application Priority Data

May 26, 2020 (CN) .......................... 202020915476.9

(51) Int. Cl.
*B60N 2/28* (2006.01)
*B60N 2/75* (2018.01)

(52) U.S. Cl.
CPC ........... *B60N 2/2806* (2013.01); *B60N 2/763* (2018.02)

(58) Field of Classification Search
CPC .................................................. B60N 2/2806
See application file for complete search history.

(56) References Cited

U.S. PATENT DOCUMENTS

| | | | |
|---|---|---|---|
| 10,696,192 B2 * | 6/2020 | Harmes, V .......... | B60N 2/2872 |
| 2014/0084649 A1 * | 3/2014 | Guo ..................... | B60N 2/2866 |
| | | | 297/250.1 |
| 2017/0190268 A1 | 7/2017 | Zhao | |
| 2018/0079330 A1 * | 3/2018 | Williams ............. | B60N 2/2806 |
| 2018/0264977 A1 * | 9/2018 | Anderson ............ | B60N 2/2878 |
| 2018/0345827 A1 * | 12/2018 | Anderson ............ | B60N 2/2821 |

* cited by examiner

*Primary Examiner* — David R Dunn
*Assistant Examiner* — Tania Abraham
(74) *Attorney, Agent, or Firm* — Volpe Koenig

(57) ABSTRACT

A safety belt fastening device includes a fastening arm. One end of the fastening arm is pivotally connected to a seat body of a child safety seat. The safety belt fastening device further includes an engaging structure connected to the fastening arm and for engaging with the seat body of the child safety seat, and a driving structure for driving the engaging structure to engage with the seat body in a locking status or to disengage from the seat body in a releasing status. The safety belt fastening device and the child safety seat therewith have advantages of easy operation, simple structure, high fastening strength for a safety belt, that the safety belt is not easy to fall off, that the safety belt is easy to release, and capability of meeting needs of different users.

18 Claims, 4 Drawing Sheets

SAFETY BELT FASTENING DEVICE AND CHILD SAFETY SEAT THEREWITH

BACKGROUND OF THE INVENTION

1. Field of the Invention

The present invention relates to a safety belt fastening device and a child safety seat therewith, and more particularly, to a safety belt fastening device and a child safety seat therewith having advantages of easy operation, simple structure, high fastening strength for a safety belt, that the safety belt is not easy to fall off, that the safety belt is easy to release, and capability of meeting needs of different users.

2. Description of the Prior Art

At present, safety belts are widely used and mainly for absorbing impact during an accidental collision, so as to protect passengers in a vehicle. Therefore, higher requirements for the safety belts and fastening of the safety belts are needed. The safety belts are required to have high fastening strength, be not easy to fall off, and be easy to release. Therefore, there is a need to provide a safety belt fastening device with simple structure and high fastening strength for the safety belt, and for the safety belt not easy to fall off and easy to release.

SUMMARY OF THE INVENTION

Therefore, an objective of the present invention is to provide a safety belt fastening device and a child safety seat therewith having advantages of easy operation, simple structure, high fastening strength for a safety belt, that the safety belt is not easy to fall off, that the safety belt is easy to release, and capability of meeting needs of different users, for solving the aforementioned problems.

In order to achieve the aforementioned objective, the present invention discloses a safety belt fastening device including a fastening arm. One end of the fastening arm is pivotally connected to a seat body of a child safety seat. The safety belt fastening device further includes an engaging structure connected to the fastening arm and for engaging with the seat body of the child safety seat, and a driving structure for driving the engaging structure to engage with the seat body in a locking status or to disengage from the seat body in a releasing status.

Preferably, the engaging structure is connected to another end of the fastening arm away from the seat body of the child safety seat.

Preferably, the engaging structure is a locking hook pivotally connected to the another end of the fastening arm away from the seat body of the child safety seat.

Preferably, the driving structure is pivotally connected to the another end of the fastening arm connected to the locking hook.

Preferably, the driving structure includes a pushing portion and an operating portion for rotatably driving the pushing portion to push the locking hook to engage with the seat body of the child safety seat in the locking status or to disengage from the seat body of the child safety seat in the releasing status.

Preferably, an accommodating slot is formed on the another end of the fastening arm connected to the locking hook and for accommodating the locking hook and the driving structure.

Preferably, the safety belt fastening device further includes a torsional spring for driving the fastening arm to spring open when the driving structure drives the locking hook to disengage from the seat body of the child safety seat in the releasing status.

Preferably, an accommodating chamber is formed inside the fastening arm, the torsional spring is accommodated in the accommodating chamber, an end of the torsional spring is fixed on an end of the fastening arm away from the locking hook, and another end of the torsional spring is fixed on the locking hook.

In order to achieve the aforementioned objective, the present invention further discloses a child safety seat including a seat body including at least one positioning component. The child safety seat further includes at least one safety belt fastening device installed on the seat body. The at least one safety belt fastening device includes a fastening arm. One end of the fastening arm is pivotally connected to the seat body. The at least one safety belt fastening device further includes an engaging structure connected to the fastening arm and for engaging with the at least one positioning component, and a driving structure for driving the engaging structure to engage with the at least one positioning component in a locking status or to disengage from the at least one positioning component in a releasing status.

Preferably, the seat body further includes a seating portion and a backrest portion, a first installation slot and a second installation slot are respectively formed on the seating portion and the backrest portion, the seat body includes two positioning components respectively disposed on an end of the first installation slot and an end of the second installation slot, and the child safety seat includes two safety belt fastening devices accommodated in the first installation slot and the second installation slot respectively.

In summary, the safety belt fastening device of the present application includes the fastening arm, the engaging structure and the driving structure. The driving structure can drive the engaging structure to engage with the positioning component in the locking status or to disengage from the positioning component in the releasing status. When the engaging structure engages with the positioning component in the locking status, the safety belt is tightened and fastened. When the engaging structure disengages from the positioning component in the releasing status, the safety belt is loosened and released. The driving structure can drive the engaging structure to fasten or release the safety belt. Therefore, the safety belt fastening device and the child safety seat therewith have advantages of easy operation, simple structure, high fastening strength for the safety belt, that the safety belt is not easy to fall off, that the safety belt is easy to release, and capability of meeting needs of different users.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
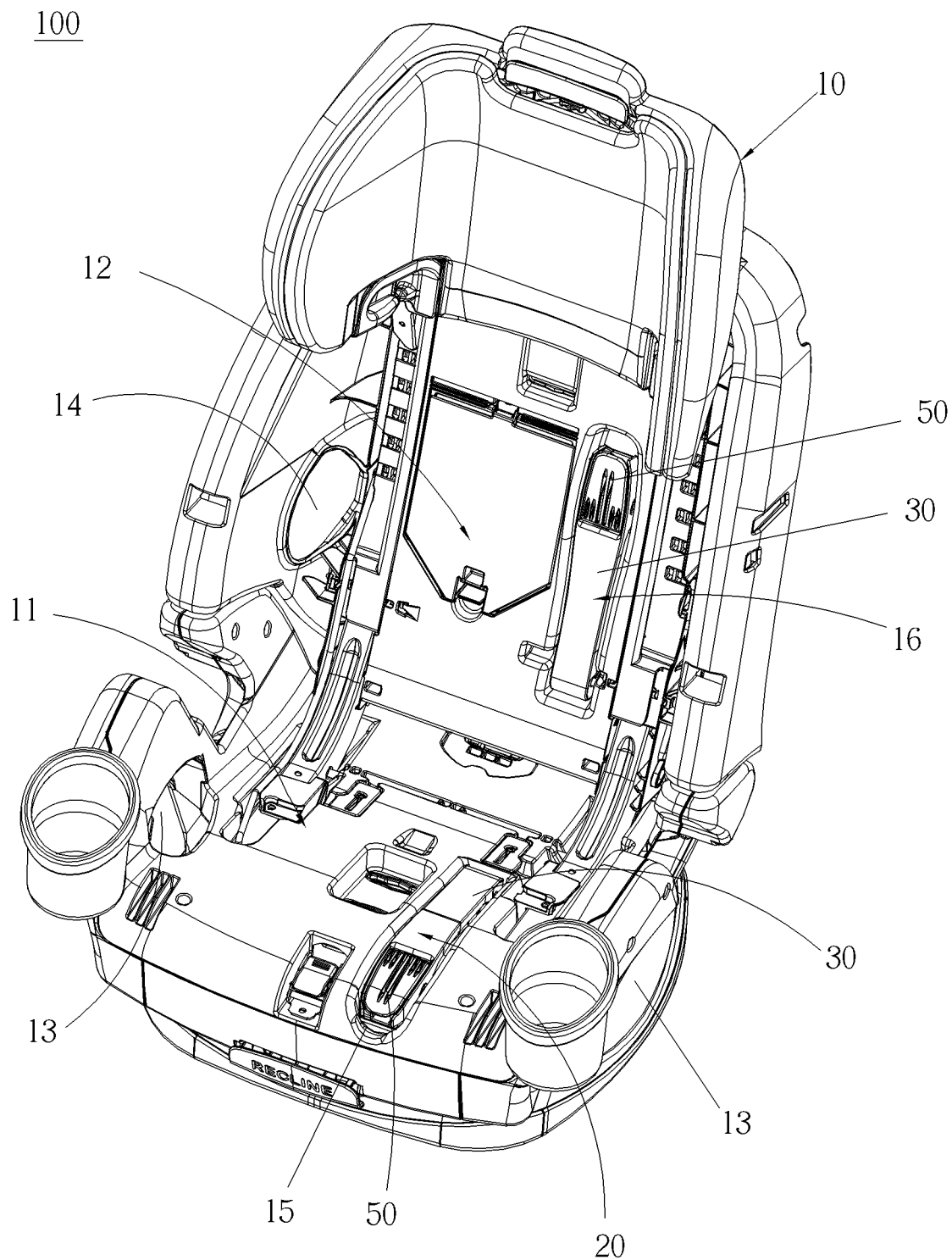
FIG. 1 is a diagram of a child safety seat with a safety belt fastening device in a locking status according to an embodiment of the present application.
Figure 2:
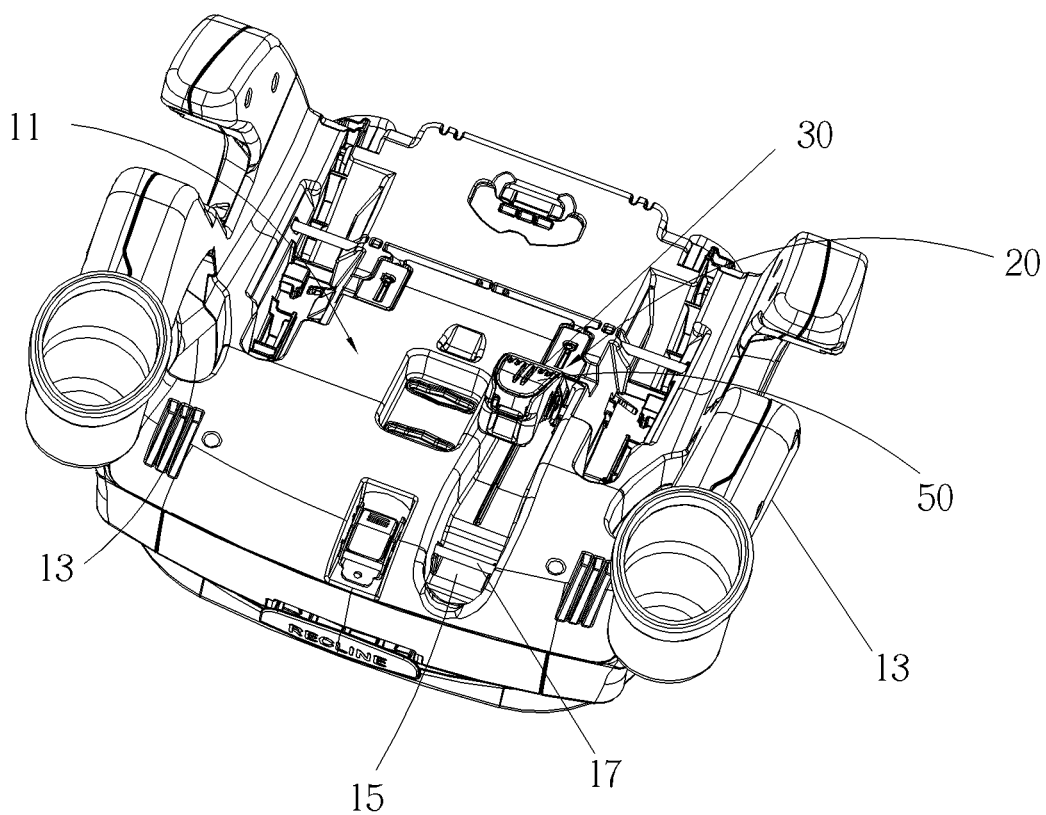
FIG. 2 is a partial diagram of the child safety seat with the safety belt fastening device in a releasing status according to the embodiment of the present application.
Figure 3:
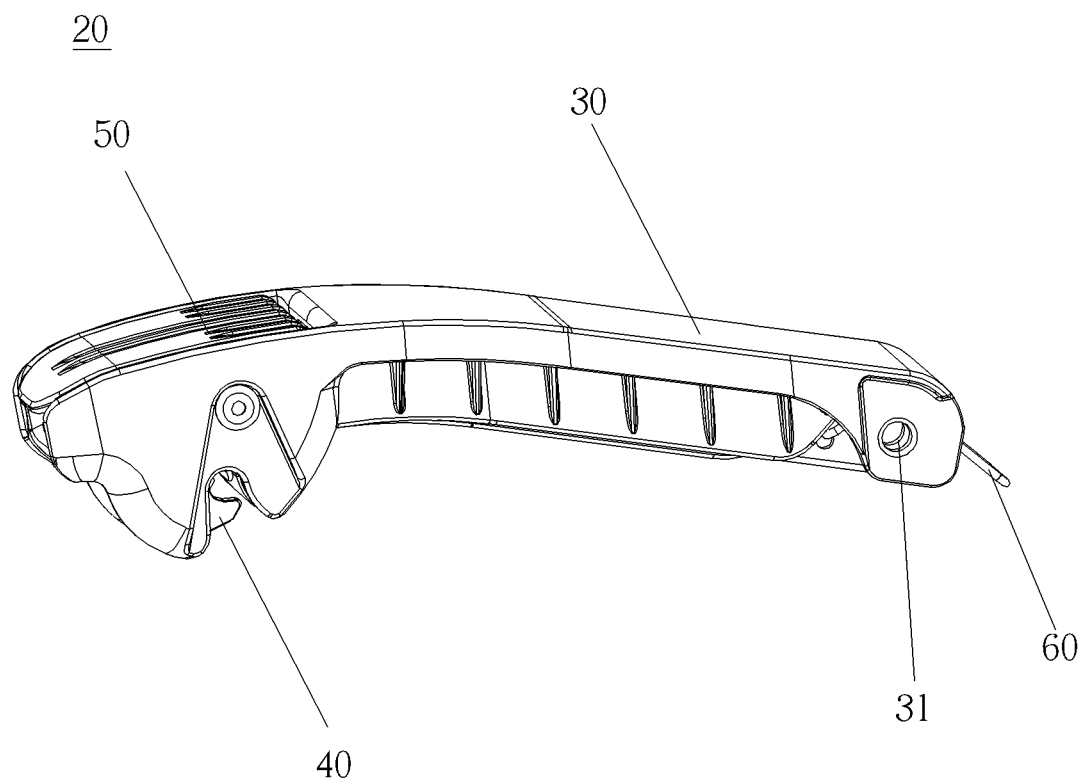
FIG. 3 is a diagram of the safety belt fastening device according to the embodiment of the present application.
Figure 4:
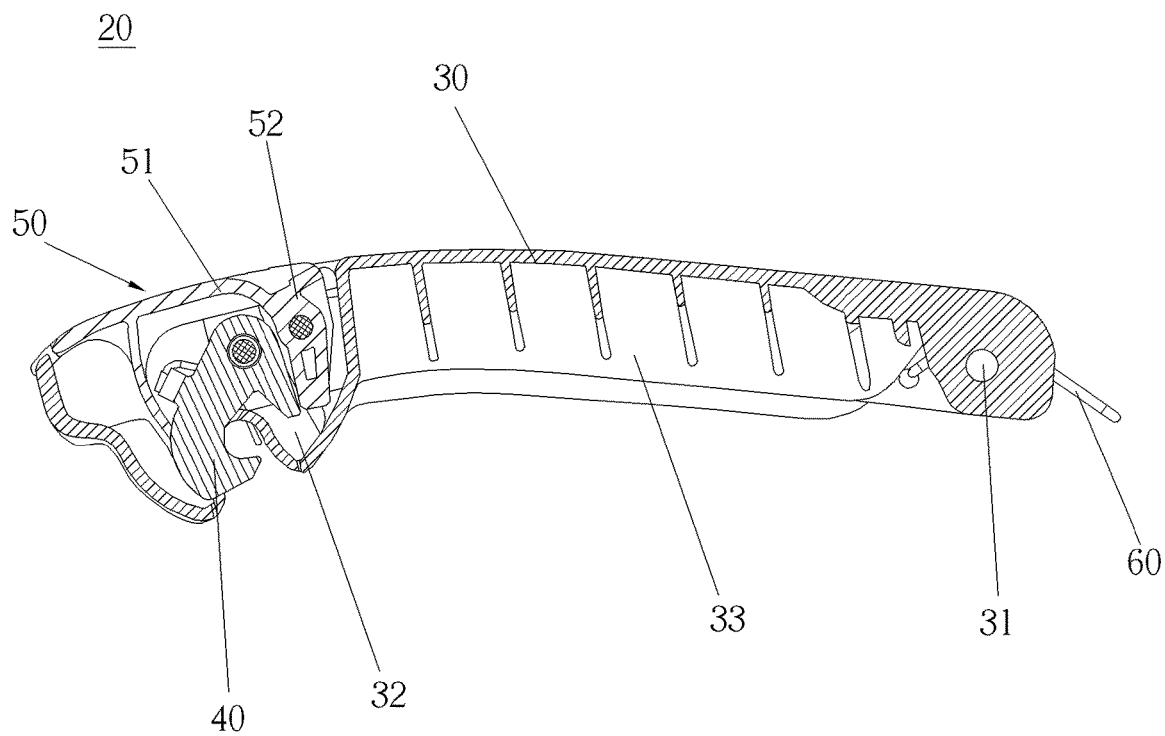
FIG. 4 is a sectional diagram of the safety belt fastening device according to the embodiment of the present application.
Figure 5:
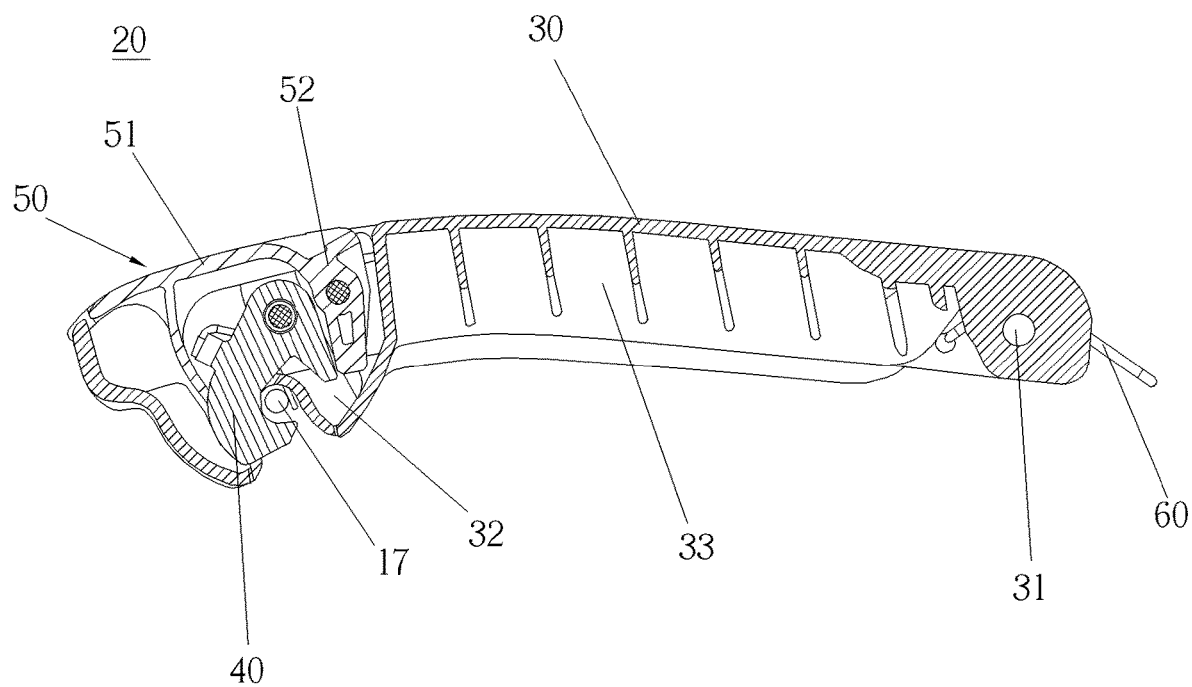
FIG. 5 is a sectional diagram of an engaging structure engaging with a positioning component in the locking status according to the embodiment of the present application.

Please refer to FIG. 1 to FIG. 6. FIG. 1 is a diagram of a child safety seat 100 with a safety belt fastening device 20 in a locking status according to an embodiment of the present application. FIG. 2 is a partial diagram of the child safety seat 100 with the safety belt fastening device 20 in a releasing status according to the embodiment of the present application. FIG. 3 is a diagram of the safety belt fastening device 20 according to the embodiment of the present application. FIG. 4 is a sectional diagram of the safety belt fastening device 20 according to the embodiment of the present application. FIG. 5 is a sectional diagram of an engaging structure 40 engaging with a positioning component 17 in the locking status according to the embodiment of the present application. The child safety seat 100 can be a child car safety seat. The child safety seat 100 includes a seat body 10 and at least one safety belt fastening device 20 installed on the seat body 10. Specifically, the seat body 10 includes a seating portion 11 and a backrest portion 12, and the at least one safety belt fastening device 20 can be installed on the seating portion 11 and/or the backrest portion 12. As shown in FIG. 1, two safety belt fastening devices 20 are installed on the seating portion 11 and the backrest portion 12, respectively.

It can be understood that the child safety seat 100 can be installed in a forward-facing configuration or a rearward-facing configuration according to needs of passengers. When the passenger is younger, the rearward-facing configuration can be adopted to make the passenger ride in a vehicle in a rearward-facing orientation. At this time, a safety belt passes through two first through holes 13, and the safety belt fastening device 20 installed on the seating portion 11 can be used to tighten and fasten the safety belt. When the passenger is elder, the forward-facing configuration can be adopted to make the passenger ride in the vehicle in a forward-facing orientation. At this time, the safety belt passes through at least one second through hole 14, and the safety belt fastening device 20 installed on the backrest portion 12 can be used to tighten and fasten the safety belt. Specifically, a first installation slot 15 and a second installation slot 16 are respectively formed on the seating portion 11 and the backrest portion 12, the two safety belt fastening devices 20 are accommodated in the first installation slot 15 and the second installation slot 16 respectively, and the seat body 10 further includes two positioning components 17 respectively disposed on an end of the first installation slot 15 and an end of the second installation slot 16.

As shown in FIG. 3 to FIG. 5, taking the safety belt fastening devices 20 accommodated in the first installation slot 15 on the seating portion 11 as an example, the safety belt fastening device 20 includes a fastening arm 30, and one end of the fastening arm 30 is pivotally connected to the seat body 10. The safety belt fastening device 20 further includes the engaging structure 40 connected to the fastening arm 30 and for engaging the corresponding positioning component 17 of the seat body 11 so as to fasten the safety belt. The safety belt fastening device 20 further includes a driving structure 50 for driving the engaging structure 40 to engage with the corresponding positioning component 17 in the locking status or to disengage from the corresponding positioning component 17 in the releasing status. When the engaging structure 40 engages with the corresponding positioning component 17 on the first installation slot 15 in the locking status, the safety belt can be tightened and fastened. When the engaging structure 40 disengages from the corresponding positioning component 17 on the first installation slot 15 in the releasing status, the safety belt can be loosened and released.

Please refer to FIG. 3 to FIG. 5, the one end of the fastening arm 30 can be pivotally connected to the seat body 10 via an installation hole 31. An installation rib, which is not shown in figures, can be installed in the installation hole 31 so as to position the fastening arm 30. The fastening arm 30 can pivot to switch the engaging structure 40 between the locking status and the releasing status. The engaging structure 40 is connected to another end of the fastening arm 30 away from the seat body 10 of the child safety seat 100. Specifically, the engaging structure 40 can be a locking hook pivotally connected to the another end of the fastening arm 30 away from the seat body 10. The driving structure 50 is pivotally connected to the another end of the fastening arm 30 connected to the locking hook. The driving structure 50 includes a pushing portion 52 and an operating portion 51 for rotatably driving the pushing portion 52 to push the locking hook to engage with the positioning component 17 in the locking status or to disengage from the positioning component 17 in the releasing status. Preferably, an accommodating slot 32 is formed on the another end of the fastening arm 30 connected to the locking hook and for accommodating the locking hook and the driving structure 50, so as to prevent the locking hook and the driving structure 50 from protruding outside the fastening arm 30 which affects outward appearance. Preferably, the safety belt fastening device 20 further includes a torsional spring 60 accommodated in an accommodating chamber 33 formed inside the fastening arm 30, an end of the torsional spring 60 is fixed on an end of the fastening arm 30 away from the locking hook, and another end of the torsional spring 60 is fixed on the locking hook.

When it is desired to release the safety belt that passes through the two first through holes 13 transversely, the operating portion 51 can be operated in a releasing direction for rotatably driving the pushing portion 52 to push the locking hook to pivot in the releasing direction so as to disengage the locking hook from the positioning component 17 in the releasing status. And then the torsional spring 60 can drive the fastening arm 30 to spring open. It should be noticed that the first installation slot 15 and the second installation slot 16 can have same structures and the safety belt fastening devices 20 accommodated in the first installation slot 15 and the second installation slot 16 can have same structures, and detailed description of the safety belt fastening device 20 accommodated in the second installation slot 16 is hereby omitted for simplicity.

In contrast to the prior art, the safety belt fastening device 20 of the present application includes the fastening arm 30, the engaging structure 40 and the driving structure 50. The driving structure 50 can drive the engaging structure 40 to engage with the positioning component 17 in the locking status or to disengage from the positioning component 17 in the releasing status. When the engaging structure 40 engages with the positioning component 17 in the locking status, the safety belt is tightened and fastened. When the engaging structure 40 disengages from the positioning component 17 in the releasing status, the safety belt is loosened and released. The driving structure 50 can drive the engaging structure 40 to fasten or release the safety belt. Therefore, the safety belt fastening device 20 and the child safety seat 100 therewith have advantages of easy operation, simple structure, high fastening strength for the safety belt, that the safety belt is not easy to fall off, that the safety belt is easy to release, and capability of meeting needs of different users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety belt fastening device comprising:
    a fastening arm, one end of the fastening arm being pivotally connected to a seat body of a child safety seat;
    an engaging structure connected to the fastening arm and for engaging with the seat body of the child safety seat; and
    a driving structure for driving the engaging structure to engage with the seat body of the child safety seat in a locking status or to disengage from the seat body of the child safety seat in a releasing status, wherein the driving structure comprises a pushing portion and an operating portion for rotatably driving the pushing portion to push the engaging structure to disengage from the seat body of the child safety seat in the releasing status, and the operating portion is further for rotatably driving the pushing portion to push the engaging structure to engage with the seat body of the child safety seat in the locking status.

2. The safety belt fastening device of claim 1, wherein the engaging structure is connected to another end of the fastening arm away from the seat body of the child safety seat.

3. The safety belt fastening device of claim 2, wherein the engaging structure is a locking hook pivotally connected to the another end of the fastening arm away from the seat body of the child safety seat.

4. The safety belt fastening device of claim 3, wherein the driving structure is pivotally connected to the another end of the fastening arm connected to the locking hook.

5. The safety belt fastening device of claim 4, wherein the operating portion is further for rotatably driving the pushing portion to push the locking hook to engage with the seat body of the child safety seat in the locking status.

6. The safety belt fastening device of claim 3, wherein an accommodating slot is formed on the another end of the fastening arm connected to the locking hook and for accommodating the locking hook and the driving structure.

7. The safety belt fastening device of claim 3, further comprising a torsional spring for driving the fastening arm to spring open when the driving structure drives the locking hook to disengage from the seat body of the child safety seat in the releasing status.

8. The safety belt fastening device of claim 7, wherein an accommodating chamber is formed inside the fastening arm, the torsional spring is accommodated in the accommodating chamber, an end of the torsional spring is fixed on an end of the fastening arm away from the locking hook, and another end of the torsional spring is fixed on the locking hook.

9. The safety belt fastening device of claim 1, further comprising a torsional spring for driving the fastening arm to spring open when the driving structure drives the engaging structure to disengage from the seat body of the child safety seat in the releasing status.

10. A child safety seat comprising:
    a seat body comprising at least one positioning component; and
    at least one safety belt fastening device installed on the seat body, the at least one safety belt fastening device comprising:
    a fastening arm, one end of the fastening arm being pivotally connected to the seat body;
    an engaging structure connected to the fastening arm and for engaging with the at least one positioning component; and
    a driving structure for driving the engaging structure to engage with the at least one positioning component in a locking status or to disengage from the at least one positioning component in a releasing status, wherein the driving structure comprises a pushing portion and an operating portion for rotatably driving the pushing portion to push the engaging structure to disengage from the at least one positioning component in the releasing status, and the operating portion is further for rotatably driving the pushing portion to push the engaging structure to engage with the at least one positioning component in the locking status.

11. The child safety seat of claim 10, wherein the engaging structure is connected to another end of the fastening arm away from the seat body.

12. The child safety seat of claim 11, wherein the engaging structure is a locking hook pivotally connected to the another end of the fastening arm away from the seat body.

13. The child safety seat of claim 12, wherein the driving structure is pivotally connected to the another end of the fastening arm connected to the locking hook.

14. The child safety seat of claim 13, wherein the operating portion is further for rotatably driving the pushing portion to push the locking hook to engage with the at least one positioning component in the locking status.

15. The child safety seat of claim 12, wherein an accommodating slot is formed on the another end of the fastening arm connected to the locking hook and for accommodating the locking hook and the driving structure.

16. The child safety seat of claim 12, wherein the at least one safety belt fastening device further comprises a torsional spring for driving the fastening arm to spring open when the driving structure drives the locking hook to disengage from the at least one positioning component in the releasing status.

17. The child safety seat of claim 16, wherein an accommodating chamber is formed inside the fastening arm, the torsional spring is accommodated in the accommodating chamber, an end of the torsional spring is fixed on an end of the fastening arm away from the locking hook, and another end of the torsional spring is fixed on the locking hook.

18. The child safety seat of claim 10, wherein the seat body further comprises a seating portion and a backrest portion, a first installation slot and a second installation slot are respectively formed on the seating portion and the backrest portion, the seat body comprises two positioning components respectively disposed on an end of the first installation slot and an end of the second installation slot, and the child safety seat comprises two safety belt fastening devices accommodated in the first installation slot and the second installation slot respectively.

* * * * *